United States Patent [19]

Pepi et al.

[11] Patent Number: 4,601,553
[45] Date of Patent: Jul. 22, 1986

[54] FINE FIGURING ACTUATOR

[75] Inventors: John W. Pepi, Maynard; Christopher M. Finch, Lowell, both of Mass.

[73] Assignee: The United States of America as represented by the Secretary of the Air Force, Washington, D.C.

[21] Appl. No.: 661,833

[22] Filed: Oct. 17, 1984

[51] Int. Cl.$^4$ .............................................. G02B 7/18
[52] U.S. Cl. ................................................... 350/611
[58] Field of Search ............................... 350/611, 360

[56] References Cited

U.S. PATENT DOCUMENTS

| | | | |
|---|---|---|---|
| 3,261,016 | 7/1966 | Burr | 350/611 |
| 3,330,958 | 7/1967 | Kaisler et al. | 250/203 |
| 4,402,575 | 9/1983 | Jacobs | 350/486 |

OTHER PUBLICATIONS

"Figure Control for a Fully Segmented Telescope Mirror" by T. S. Mast and J. E. Nelson, J. App. Opt., vol. 21, No. 14, pp. 2631-2641, (Jul. 15, 1982).

Primary Examiner—Jon W. Henry
Attorney, Agent, or Firm—Donald J. Singer; Bobby D. Scearce

[57] ABSTRACT

A novel mirror structure and actuator for precision control of the contour of a mirrored surface is described which comprises a movable control member for contacting the mirror faceplate, and a position controller, which may be in the form of an electrically controlled magnet and coil assembly, operatively interconnecting the control member and a rigid support for the mirror structure; a position sensor operatively interconnects the control member and the mirror support to sense the position of the control member and to provide a corresponding output signal; programmable information processing electronics, responsive to the output signal of the position sensor, provides an input signal to the position controller to move the control member against the faceplate whereby the shape of the faceplate may be controlled according to a preprogrammed scheme applied to the electronics.

4 Claims, 1 Drawing Figure

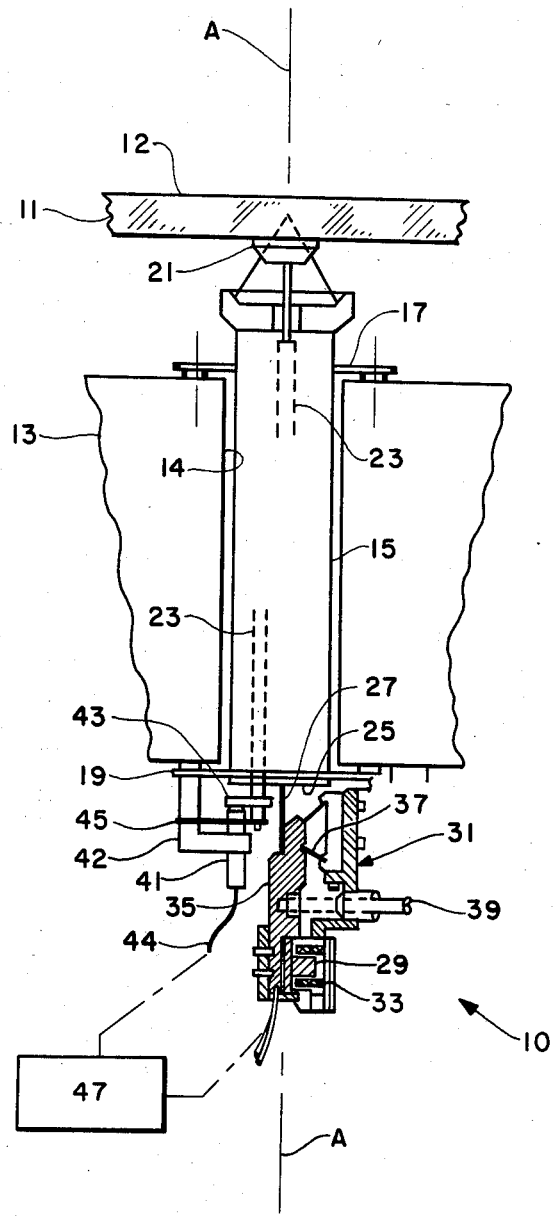

FINE FIGURING ACTUATOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to improvements in controllable supports for precision optical components, and more particularly to a novel actuator for precisely controlling the contour of a mirrored surface, and to an improved mirror structure incorporating the novel actuator.

Mirrors included in the optical trains of precision optical systems may be subject to substantial forces tending to impair the utility of the optical system. For example, mirrors used to define the optical resonant cavity of a laser system, or to define an optical train in the utilization of the laser output, may be subject to severe thermal or pressure induced stresses which distort the reflective surface of the mirror. Accordingly, it may be highly desirable to provide means adjacent such a mirror to modify the shape of the reflective surface of the mirror in controlled manner whereby a predetermined mirrored surface contour may be maintained.

The present invention provides an novel actuator for precisely controlling the contour of a mirrored surface supported on a thin mirror faceplate, whereby a predetermined mirrored contour may be maintained against the influence of thermal or pressure effects, or may be selectively and precisely changed in a programmed, preselected manner. The actuator of the present invention may be utilized in conjunction with a suitable mirrored faceplate to selectively introduce optical path differences of dimensions in the optical wavelength range over the surface of the faceplate to compensate for optical path difference errors in the wave front incident on the mirror resulting from distortions of the mirrored surface. The actuator comprises a magnet and coil, operatively connected by way of a web of stabilizing flexures to an actuating rod in contact with the rear surface of a mirrored faceplate. The position of the actuator rod may be precisely controlled through electrical signals to the coil. A position sensor monitors the position of the actuator rod.

It is, therefore, a principal object of the present invention to provide an actuator for precisely controlling the contour of a mirrored surface.

It is a further object of the invention to provide an improved optical mirror having precision controllable contour.

These and other objects of the present invention will become apparent as the detailed description of certain representative embodiments thereof proceeds.

SUMMARY OF THE INVENTION

In accordance with the foregoing principles and objects of the present invention, a novel mirror structure and actuator for precision control of the contour of a mirrored surface is described which comprises a movable control member for contacting the mirror faceplate, and a position controller, which may be in the form of an electrically controlled magnet and coil assembly, operatively interconnecting the control member and a rigid support for the mirror structure; a position sensor operatively interconnects the control member and the mirror support to sense the position of the control member and to provide a corresponding output signal; programmable information processing electronics, responsive to the output signal of the position sensor, provides an input signal to the position controller to move the control member against the faceplate whereby the shape of the faceplate may be controlled according to a preprogrammed scheme applied to the electronics.

DESCRIPTION OF THE DRAWINGS

The present invention will be more clearly understood from the following detailed description of certain representative embodiments thereof read in conjunction with the accompanying drawing which is a schematic illustration in partial axial section of a representative actuator system of the present invention.

DETAILED DESCRIPTION

Referring now to the accompanying drawing, shown therein is a schematic axial sectional view of a representative actuator 10 system of the present invention. A flexible faceplate 11 supporting a mirrored surface 12 of predetermined contour may comprise a part of a precision optical system, such as might define the optical resonant cavity of a laser system, and, consequently, it may be desirable to precisely control the shape of mirrored surface 12 to correct for environmentally induced deviations or structural distortions in the optical surface from the predetermined contour. To this end, one or more actuators 10 may be mounted behind and in contact with faceplate 11 as suggested in the drawing. A substrate 13, which may otherwise provide structural support to faceplate 11, such as around its periphery and at other selected sites at the rear surface thereof, may include one or more openings 14 for receiving a like number of actuators 10 to controllably support faceplate 11.

In the representative embodiment illustrated in the drawing, actuator 10 comprises a support tube 15 of length corresponding to the thickness of the supporting substrate 13, substantially as shown, although the size of the actuator 10 is not limiting of the teachings herein. Support tube 15 is resiliently supported within opening 14 and near each end by a pair of annularly shaped flexure supports 17,19 which restrain support tube 15 to a relatively small degree of axial movement within opening 14 along axis A of support tube 15. A contact pad 21 in contact with the rear surface of faceplate 11 is attached to the end of a measurement rod 23 (shown hidden and represented by the dotted lines in the drawing) coaxial with and traversing the length of support tube 15 and providing structural linkage between the control mechanism of actuator 10 and contact pad 21. Rod 23 is shown offset in the drawing in order to better depict the structure of the control mechanism of actuator 10. A fitting 25 may comprise a rear end cap of support tube 15 and through which measurement rod 23 extends, and is attached to an output flexure 27 substantially as shown. Output flexure 27 is radially compliant and axially rigid in order to provide positive connection between support tube 15 and the means provided for controlling the position of rod 23, such as the control mechanism hereinafter described in a representative embodiment.

A permanent magnet 29 is rigidly supported below support tube 15 and near axis A by a base support assembly 31, which is in turn rigidly attached to and supported by substrate 13. A voice coil 33 is connected to a movable actuator arm 35 which is in turn connected to output flexure 27; actuator arm 35 is pivotally connected to base support assembly 31 through a flexible pivot mounting 37 substantially as shown. A manual adjustment screw 39 is included as part of the structure of base support assembly 31 and disposed to contact actuator arm 35, substantially as shown in the drawing, in order to provide manual adjustability for actuator arm 35, flexure 27 and support tube 15. A position sensor or transducer 41, supported rigidly by substrate 13 through a support 42 is held in contact with a tab 43 attached to measurement rod 23. Stabilizing flexure 45 may be included to flexibly interconnect measurement rod 23 and support 42 to resiliently support rod 23 within support tube 15. Position sensor 41 provides an output signal corresponding to the position of tab 43 through output means 44 connected to control/information processing electronics 47.

In the operation of actuator 10 to provide fine control of the contour of mirrored surface 12 through contact with the rear of faceplate 11, actuator 10 may first be installed in an opening 14 of substrate 13 with pad 21 just in contact with the rear of faceplate 11, followed by suitable manual positioning of actuator arm 35 and coil 33 using adjustment screw 39, and adjustment of position sensor 41 to provide a reference postion for measurement rod 23. A small distortion of the mirrored surface 12 is then manifested by a corresponding movement of faceplate 11, which movement is detected by position sensor 41 as an axial movement of measurement rod 23 along axis A. Position sensor 41 provides an output signal to control/information electronics 47 corresponding to the detected movement of rod 23. A signal in the form of an electrical current, corresponding to the output signal from position sensor 41 and applied according to a scheme preprogrammed into control/information processing electronics 47, may then be applied to voice coil 33 in order to compensate for the detected deviation of mirrored surface 12 from a predetermined contour. The electrical current applied to coil 33 interacts with the magnetic field of magnet 29 resulting in a lateral deflection of actuator arm 35 about pivot flexure 37. The lateral (pivotal) movement of actuator arm 35 is converted to a very small, precisely controllable axial movement of support tube 15 by reason of the mechanical linkage between actuator arm 35 and support tube 15 provided by output flexure 27. The degree of axial movement imparted to support tube 15 is translated to axial movement of contact pad 21, which results in a small, precisely controllable displacement of faceplate 11 and mirrored surface 12.

The present invention, as hereinabove described, therefore provides a novel actuator for precisely controlling the shape of a mirrored surface in order to compensate for small deviations of the surface from a predetermined contour resulting from thermal, pressure or other environmental effects on the mirror. Deviations of magnitude in the optical wavelength range may thus be controllable. In an actuator built in demonstration of the invention herein, deviations in the range of about 0.01 micron could be detected and corrected.

It is understood that certain modifications to the invention as described may be made, as might occur to one with skill in the field of this invention, within the scope of the appended claims. Therefore, all embodiments contemplated hereunder which achieve the objectives of the invention have not been shown in complete detail. Other embodiments may be developed without departing from the spirit of the invention or from the scope of the appended claims.

We claim:

1. An actuator for controlling the shape of a faceplate supporting a mirrored surface, comprising:
   a. a substantially rigid support;
   b. a movable control member for contacting said faceplate;
   c. an electrically controlled magnet and coil assembly operatively interconnecting said rigid support and said control member and responsive to an input signal to said magnet and coil assembly, one of said magnet and coil operatively attached to said rigid support and the other operatively attached to said control member for controllably moving said member against said faceplate whereby the shape of said faceplate is controllably altered near the point of contact of said control member with said faceplate; and
   d. a position transducer operatively interconnecting said control member and said support, for sensing the position of said control member relative to said support and providing a corresponding output signal.

2. The actuator as recited in claim 1 further comprising programmable electronic means, operatively connected to said position transducer and magnet and coil assembly and responsive to said output signal, for processing said output signal and providing said input signal to said magnet and coil assembly whereby said member is controllably positioned according to a preprogrammed scheme applied to said electronics means.

3. A mirror structure comprising:
   a. a flexible faceplate having a first surface and a second surface, said faceplate supporting a mirrored surface on said first surface;
   b. a substantially rigid support;
   c. a movable control member contacting said faceplate at said second surface thereof;
   d. an electrically controlled magnet and coil assembly operatively interconnecting said rigid support and said control member and responsive to an input signal to said magnet and coil assembly, one of said magnet and coil operatively attached to said rigid support and the other operatively attached to said control member for controllably moving said member against said faceplate whereby the shape of said faceplate is controllably altered near the point of contact of said control member with said faceplate; and
   e. a position transducer operatively interconnecting said control member and said support, for sensing the position of said control member relative to said support and providing a corresponding output signal.

4. The mirror structure as recited in claim 3 further comprising programmable electronics means, operatively connected to said position transducer and magnet and coil assembly and responsive to said output signal, for processing said output signal and providing said input signal to said magnet and coil assembly whereby said member is controllably positioned according to a preprogrammed scheme applied to said electronics means.

* * * * *